No. 739,815.

Patented September 29, 1903.

UNITED STATES PATENT OFFICE.

GEORGE H. BECKER, OF COVINGTON, KENTUCKY.

COMPRESSED COAL COMPOUND.

SPECIFICATION forming part of Letters Patent No. 739,815, dated September 29, 1903.

Application filed March 20, 1903. Serial No. 148,766. (No specimens.)

*To all whom it may concern:*

Be it known that I, GEORGE H. BECKER, a citizen of the United States, residing at Covington, county of Kenton, and State of Kentucky, have invented a new and useful composition of matter to be used as fuel, said composition to be known as the Compressed Coal Compound, of which the following is a specification.

My composition consists, first, of the following ingredients, combined by the following methods in the following proportions: coal-slack, two thousand pounds; black oxid of manganese, from eight to twelve pounds; rosin, from one hundred and twenty-five to two hundred pounds; oil, (mineral or vegetable,) from five to eight gallons; diluted sulfuric acid, (strength of 10° Baumé,) from sixteen to twenty gallons.

The compound may be formed by using any of the above proportions; but the best results will be obtained when these ingredients are united in the following proportions: coal-slack, two thousand pounds; black oxid of manganese, ten pounds; rosin, one hundred and twenty-five pounds; oil, (mineral or vegetable,) five gallons; diluted sulfuric acid, (strength of 10° Baumé,) sixteen gallons. These ingredients are compounded in the following manner: The coal-slack is ground into a fine powder. During the process of grinding the black oxid of manganese is added in order that it may be thoroughly and evenly mixed with the coal-powder. The mixture is then heated until a temperature of between 200° and 300° Fahrenheit is reached. This temperature is kept up for one hour. The best result is obtained, however, when a temperature of 200° Fahrenheit is used.

Second. In a separate receptacle the rosin and oil are melted together. When the temperature is sufficiently great to combine the ingredients, the solution of diluted sulfuric acid is added. During the process of adding the diluted sulfuric acid the compound rosin and oil is kept in constant agitation. The agitation is continued until a varnish-like emulsion has formed. During the process of combining the diluted sulfuric acid with the rosin-and-oil compound the temperature should range between 150° and 175° Fahrenheit. The best results are obtained with a temperature of 150° Fahrenheit.

Third. When the compound described in two has formed into a uniform emulsion, it is added to the mixture described in one. It must be added slowly under constant agitation while the coal-powder and black oxid of manganese are at a temperature of between 200° and 300° Fahrenheit. The best results, however, are obtained when a temperature of 200° Fahrenheit is used. When the whole mass has resolved into a granular adhesive consistency, it is ready to be placed in the molds, of any desired shape or size, and subjected to a powerful pressure.

What I claim, and desire to secure by Letters Patent of the United States, is—

1. The herein-described method or process which consists of melting rosin and oil together until they fuse, adding to this while the mass is heated to about 150° Fahrenheit diluted sulfuric acid, mixing the resulting compound with a mixture of coal-dust and black oxid of manganese that has been heated for about an hour to a temperature of 200° Fahrenheit, and subjecting the resulting product to pressure in molds of any desired shape or size.

2. As a new article of manufacture the composition of matter formed by this process consisting of coal-dust and black oxid of manganese, rosin, oil and diluted sulfuric acid.

In testimony whereof I have signed my name to this specification in the presence of two subscribing witnesses.

GEORGE H. BECKER.

Witnesses:
 PEARL BECKER,
 FLOY BECKER.